United States Patent Office 2,761,756
Patented Sept. 4, 1956

2,761,756
PROCESS FOR PRODUCTION OF URANIUM HEXAFLUORIDE

Homer F. Priest, New York, N. Y., assignor to the United States of America as represented by the United States Atomic Energy Commission No Drawing. Application January 22, 1943,
Serial No. 473,251

10 Claims. (Cl. 23—14.5)

This invention relates to an improved process for the production of uranium hexafluoride from uranyl fluoride.

The preparation of uranium hexafluoride has involved considerable difficulty. An object of the present invention is to provide a simple and efficient method for the preparation of uranium hexafluoride.

Heretofore it has generally been necessary to reduce the higher oxides of uranium to uranium dioxide, $UO_2$. The present invention eliminates the hydrogen reduction of uranium trioxide, $UO_3$, to uranium dioxide, $UO_2$, thus saving considerable time in the preparation of uranium hexafluoride, $UF_6$, as the reduction of the oxide is a step taking several hours, often as long as nine to ten hours.

Likewise, in several of the existing processes, it is necessary to use dehydrated hydrogen fluoride or anhydrous hydrofluoric acid, whereas in the present process aqueous solutions can be used as well as anhydrous hydrofluoric acid, $H_2F_2$.

It has also been necessary in some processes to convert the oxide ($UO_2$) to the lower fluorides, as uranium tetrafluoride, $UF_4$, and fluorinate the latter to uranium hexafluoride, $UF_6$, by direct fluorination at temperatures of the order of 400° C. In the present process, temperatures much lower may be utilized, for instance, of the order of 300° C. and still the time for complete fluorination to uranium hexafluoride is the same and in some instances, considerably less. Attempts to directly fluorinate higher uranium oxides have thus far proved unsuccessful, and in the present method it has been found that uranium trioxide, $UO_3$, reacts smoothly with anhydrous hydrofluoric acid or with an aqueous solution of hydrofluoric acid, $H_2F_2$, to form uranyl fluoride in a relatively short time at certain definite temperatures. If the aqueous solution is used it is necessary to evaporate the same to dryness and dehydrate the uranyl fluoride, $UO_2F_2$, at an elevated temperature.

The conversion of uranium trioxide to uranyl fluoride with anhydrous hydrofluoric acid takes place according to the reaction equation:

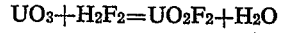
$$UO_3 + H_2F_2 = UO_2F_2 + H_2O$$

Upon fluorination of the uranyl fluoride in a proper vessel at an elevated temperature with elemental fluorine, uranium hexafluoride is formed within a few minutes after the fluorination starts and the uranium hexafluoride may pass off and be condensed by suitable condensers. Such reaction proceeds according to the following equation:

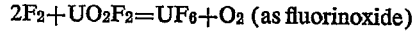
$$2F_2 + UO_2F_2 = UF_6 + O_2 \text{ (as fluorinoxide)}$$

One example of a process to be followed in accordance with the invention is as follows:

The uranium trioxide, $UO_3$, is placed in a vessel and heated to approximately 300° C. and while maintained at about that temperature anhydrous hydrofluoric acid, $H_2F_2$, is passed over the uranium trioxide for about three hours until the reaction has gone to completion and anhydrous uranyl fluoride has been formed. It is appreciated that the surface of the uranium trioxide presented for reaction as well as the rate of supplying the hydrofluoric acid affects the speed of the reaction.

After the completion of the conversion to uranyl fluoride, the vessel may be swept clear of water vapor by means of a stream of an inert gas, such as nitrogen. The temperature of the reaction vessel is thereafter raised to about 350° C., and elemental fluorine is passed over the uranyl fluoride at a suitable rate and uranium hexafluoride, $UF_6$, forms immediately. The uranium hexafluoride is passed off to a condensing chamber as it is formed. The over-all yield of uranium hexafluoride by this process is better than 94 percent.

As a modification of the preparation of the uranyl fluoride one may use an aqueous solution of hydrofluoric acid instead of the anhydrous hydrofluoric acid in which case a solution of 48 percent hydrofluoric acid has proven satisfactory. In this case the solution was evaporated and the uranyl fluoride dehydrated at an elevated temperature. A temperature of 300° C. has been used with success. After dehydration uranyl fluoride was treated with elemental fluorine in the same manner as the anhydrous uranyl fluoride.

The present invention is not to be construed as limited to any particular apparatus, temperatures of the reactions or the time of each thereof but only by the following claims in which it is desired to claim the novelty inherent in the invention.

I claim:

1. A process for the production of uranium hexafluoride which comprises reacting substantially anhydrous uranyl fluoride with elemental fluorine.

2. A process for the production of uranium hexafluoride which comprises reacting substantially anhydrous uranyl fluoride maintained at an elevated temperature with elemental fluorine.

3. A process for the production of uranium hexafluoride which comprises reacting substantially anhydrous uranyl fluoride maintained at a temperature of approximately 350° C. with elemental fluorine.

4. A process for the production of uranium hexafluoride which comprises reacting uranium trioxide maintained at an elevated temperature with substantially anhydrous hydrogen fluoride, and reacting the thus formed substantially anhydrous uranyl fluoride at an elevated temperature with elemental fluorine.

5. A process for the production of uranium hexafluoride which comprises reacting uranium trioxide maintained at approximately 300° C. with substantially anhydrous hydrogen fluoride, and reacting the thus formed substantially anhydrous uranyl fluoride at a temperature of approximately 350° C. with elemental fluorine.

6. A process for the production of uranium hexafluoride which comprises reacting uranium trioxide with an aqueous solution of hydrogen fluoride, evaporating the reacted solution to dryness, dehydrating the resultant uranyl fluoride and reacting the substantially anhydrous uranyl fluoride with elemental fluorine.

7. A process for the production of uranium hexafluoride which comprises reacting uranium trioxide with an aqueous solution of hydrogen fluoride, evaporating the reacted solution to dryness, dehydrating the resultant uranyl fluoride at a temperature of approximately 300° C. and reacting the substantially anhydrous uranyl fluoride at a temperature of approximately 350° C. with elemental fluorine.

8. A process for the production of uranium hexafluoride which comprises reacting uranium trioxide with a substance selected from the group consisting of substantially anhydrous hydrogen fluoride and an aqueous solution of hydrogen fluoride, and reacting the thus formed uranyl fluoride, in substantially anhydrous condition, with elemental fluorine.

9. A process for the production of uranium hexafluoride which comprises reacting uranium trioxide with a substance selected from the group consisting of substantially anhydrous hydrogen fluoride and an aqueous solution of hydrogen fluoride, and reacting the thus formed uranyl fluoride, in substantially anhydrous condition at an elevated temperature, with elemental fluorine.

10. A process for the production of uranium hexafluoride which comprises reacting uranium trioxide with a substance selected from the group consisting of substantially anhydrous hydrogen fluoride and an aqueous solution of hydrogen fluoride, and reacting the thus formed uranyl fluoride, in substantially anhydrous condition while maintained at a temperature of approximately 350° C., with elemental fluorine.

References Cited in the file of this patent

Mellor: "Comprehensive Treatise on Inorganic and Theoretical Chemistry," vol. XII, 1932, page 76. Copy in Division 59.